(12) United States Patent
Siegel

(10) Patent No.: US 8,491,058 B2
(45) Date of Patent: Jul. 23, 2013

(54) PORTABLE RESTRAINING PASSENGER SAFETY VEST FOR VEHICLES

(76) Inventor: Ellen K. Siegel, Southport, CT (US)

( * ) Notice: Subject to any disclaimer, the term of this patent is extended or adjusted under 35 U.S.C. 154(b) by 188 days.

(21) Appl. No.: 13/052,481

(22) Filed: Mar. 21, 2011

(65) Prior Publication Data

US 2012/0242134 A1  Sep. 27, 2012

(51) Int. Cl.
*A47D 15/00* (2006.01)
*A62B 35/00* (2006.01)
*B60R 22/10* (2006.01)

(52) U.S. Cl.
USPC .......................................................... 297/465

(58) Field of Classification Search
USPC .......................................................... 297/465
See application file for complete search history.

(56) References Cited

U.S. PATENT DOCUMENTS

| | | | | |
|---|---|---|---|---|
| 3,125,373 A * | 3/1964 | Boatman | | 297/465 |
| 3,136,581 A * | 6/1964 | Caballero | | 297/465 |
| 3,992,040 A * | 11/1976 | Gannac | | 297/465 |
| 4,026,245 A * | 5/1977 | Arthur | | 297/465 |
| 4,674,800 A | 6/1987 | Ensign | | 29/465 |
| 4,848,793 A * | 7/1989 | Huspen | | 297/465 X |
| 4,927,211 A * | 5/1990 | Bolcerek | | 297/465 |
| 5,074,588 A * | 12/1991 | Huspen | | 297/465 X |
| 5,080,191 A | 1/1992 | Sanchez | | 182/3 |
| 5,161,258 A * | 11/1992 | Coltrain | | 297/465 X |
| 5,301,371 A * | 4/1994 | Chao | | 297/465 X |
| 5,429,418 A * | 7/1995 | Lipper et al. | | 297/465 |
| 5,544,363 A | 8/1996 | McCue et al. | | 2/102 |
| 5,562,326 A * | 10/1996 | Stroud | | 297/465 |
| 5,628,548 A * | 5/1997 | Lacoste | | 297/465 X |
| 5,730,498 A | 3/1998 | Hanson et al. | | 297/465 |
| 5,733,014 A | 3/1998 | Murray | | 297/485 |
| 5,926,846 A | 7/1999 | Segal | | |
| 6,007,156 A | 12/1999 | Chang | | 297/465 |
| 6,314,578 B1 * | 11/2001 | Masuda et al. | | 297/465 X |
| D453,398 S | 2/2002 | Masuda | | |
| 6,449,770 B1 * | 9/2002 | Taylor et al. | | 297/465 X |
| 6,601,916 B1 | 8/2003 | Kamiki | | 297/250.1 |
| 6,902,193 B2 * | 6/2005 | Kim et al. | | 297/465 X |

(Continued)

FOREIGN PATENT DOCUMENTS

DE  44 01 702 A1  8/1994
WO  WO 93/05986  4/1993

OTHER PUBLICATIONS

International Search Report and Written Opinion dated Jun. 19, 2012 from PCT/US2012/029900.

*Primary Examiner* — Rodney B White
(74) *Attorney, Agent, or Firm* — Ohlandt, Greeley, Ruggiero & Perle, L.L.P.

(57) ABSTRACT

A vest includes a vest body having a back portion, a first side portion connected to the back portion and a second side portion connected to the back portion. The first side portion has a first outer surface and the second side portion has a second inner surface. The first side portion has a first connector and the second side portion has a second connector so that when the first side portion overlaps the second side portion the first connector joins to the second connector connecting the first side portion and the second side portion in a closed position. A belt has a first end and a second end that are connectable so that the belt surrounds the back portion, the first side portion and second side portion of the vest body when the first end and the second end are connected in a connected position.

13 Claims, 7 Drawing Sheets

U.S. PATENT DOCUMENTS

| | | |
|---|---|---|
| 7,131,703 B1 * | 11/2006 | Sheridan et al. .............. 297/465 |
| 7,703,150 B2 | 4/2010 | Wagner et al. |
| 7,934,775 B2 * | 5/2011 | Walker et al. ................. 297/465 |
| 2004/0169411 A1 | 9/2004 | Murray ........................ 297/486 |
| 2008/0018163 A1 * | 1/2008 | Winn et al. ................... 297/465 |
| 2008/0252132 A1 * | 10/2008 | Thomson ...................... 297/465 |
| 2010/0148564 A1 * | 6/2010 | Carter .......................... 297/465 |
| 2012/0217786 A1 * | 8/2012 | Kim .............................. 297/465 |

* cited by examiner

PORTABLE RESTRAINING PASSENGER SAFETY VEST FOR VEHICLES

BACKGROUND OF THE DISCLOSURE

1. Field of the Disclosure

The present disclosure relates to securing devices to secure a wearer to a seat in a moving vehicle. Particularly, the present disclosure relates to a safety vest that secures a wearer to a seat of a moving vehicle.

2. Description of the Related Art

Seatbelts and shoulder harnesses are currently used with seats in moving vehicles such as cars, trains and airplanes, to secure and restrain each passenger in one of the seats. Seatbelts and shoulder harnesses are designed for wearers of limited size and weight ranges. Typically, seatbelts and shoulder harnesses are designed for adults, and not for children, for example, therefore resulting in an improper fit when used with children. Devices, such as booster seats, have been used in combination with adult sized seatbelts and shoulder harnesses, however, the booster seats are controversial in their efficacy. Moreover, current commercial child seat restraints in a moving vehicle are frequently used incorrectly.

There is a need for a securing device that is used with seatbelts and shoulder harnesses that is sized based on a wearer's age and a wide range of the wearer's weight and which furthermore secures the wearer to seats in moving vehicles. There is also a need for a securing device that secures the wearer to seats in moving vehicles even if the seatbelt and shoulder harness are not sized to fit wearer. There is a further need for a securing device that utilizes pre-existing shoulder harnesses and lap belts and that is modular and thus can be used with any of the varied designs of shoulder harnesses and seat belt harnesses in virtually all moving vehicles. There is still a further need for a securing device that is a vest having two mechanisms that connects the vest to a wearer, so that if one mechanism is tampered with or fails, the other maintains the vest on the wearer.

SUMMARY OF THE DISCLOSURE

There is provided a portable restraining passenger safety vest that includes a vest body having a back portion, a first side portion connected to the back portion and a second side portion connected to the back portion on a side opposite the first side portion. The first side portion has an outer surface and the second side portion has an inner surface. The first side portion has a first connector connected to the outer surface and the second side portion has a second connector connected to the inner surface of the second side portion so that a wearer is secured in the vest when the first side portion overlaps the second side portion in a closed position. A belt has a first end and a second end that are connectable so that the belt surrounds the back portion, the first side portion and second side portion of the vest body when the first end and the second end are in a connected position. A back loop is connected to the back portion. The back loop has a first shoulder strap connected to the vest body and a rear strap connected to the vest body to form a loop between the first shoulder strap and the rear strap. The belt passes through the loop between the first shoulder strap and the rear strap, and the loop that is between the first shoulder strap and the rear strap is sized so that a seat belt can pass therethrough.

The loop that is between the first shoulder strap and the rear strap can be sized so that a seat belt and a shoulder harness of a vehicle can pass therethrough. The vest can further comprise a first crotch strap connected to the back portion and a second crotch strap connected to one of the first side portion and the second side portion. The first crotch strap is connectable to the second crotch strap. The first connector and the second connector can be a hook and loop fastener. The back portion, the first side portion and the second side portion can form a first arm hole, a second arm hole and a head hole in the closed position. The vest body can be a pararamid synthetic fiber and/or ballistic nylon, with an inside shell that is 100 percent nylon treated with a fire retardant, and an edge banding that is fire rated fabric. The first end and the second end can be connected by a belt connector. The belt connector can be a snap fit connection. The second side portion can have a protrusion so that the protrusion overlaps a majority of the first side portion in the closed position. The protrusion can extend to the back portion in the closed position.

There is still further provided that the portable restraining passenger safety vest has a first crotch strap connected to the back portion and a second crotch strap connected to one of the first side portion and the second side portion.

The above-described and other features and advantages of the present disclosure will be appreciated and understood by those skilled in the art from the following detailed description, drawings, and appended claims.

DESCRIPTION OF THE PREFERRED EMBODIMENT

Figure 1:
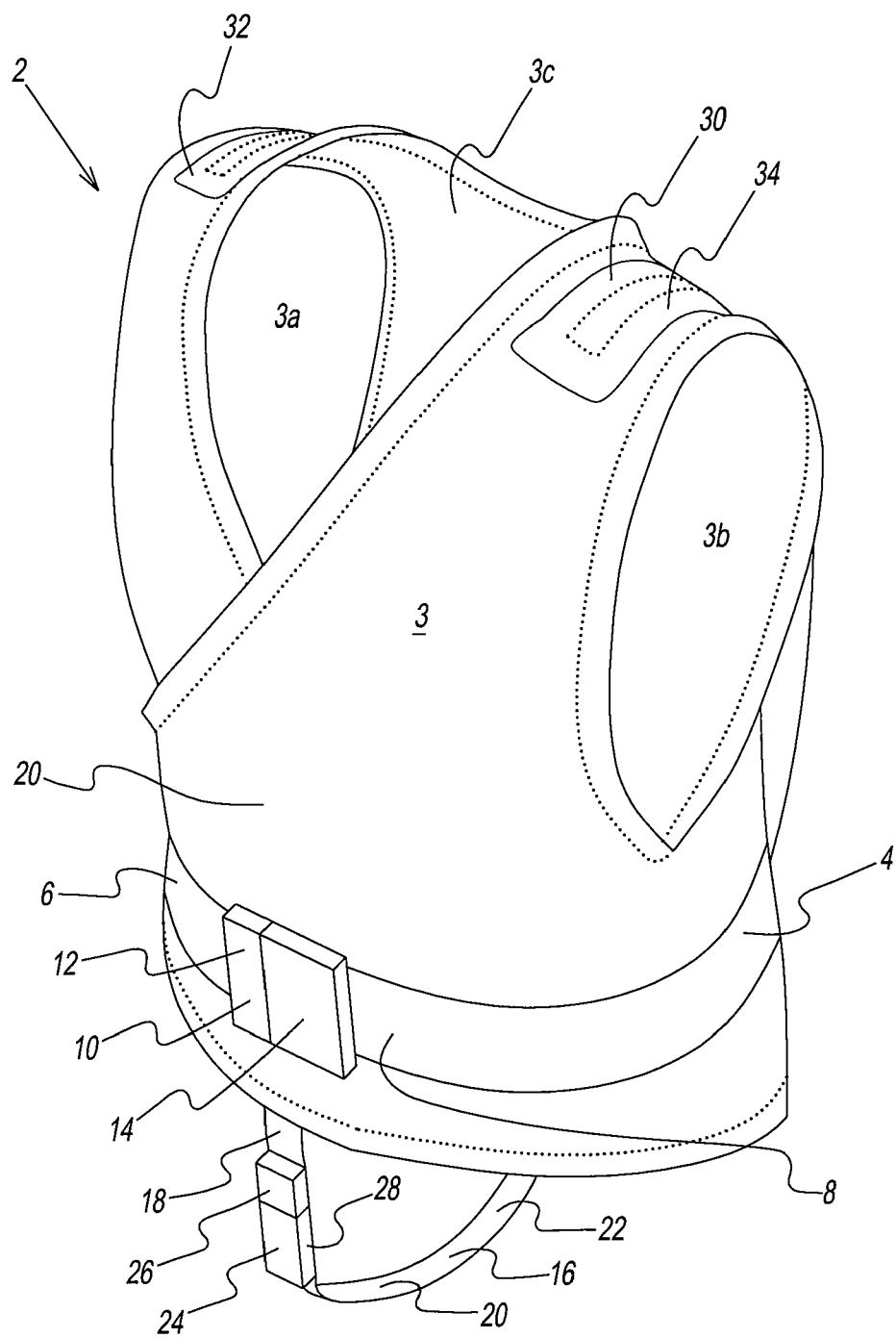
FIG. 1 is a top side perspective view of an exemplary embodiment of a vest of the present disclosure in a closed position.

Referring to the drawings and, in particular, FIG. 1, a vest of the present disclosure generally represented by reference numeral 2 is shown in a closed position. Vest 2 has a vest body 3. Vest body 3 has a pair of arm holes 3a and 3b and a head hole 3c. Vest body 3 is selected or chosen to cover a portion of a wearer's chest, shoulders and torso when positioned on a wearer's body. Vest body 3 has a belt 4 that is positioned on the exterior of vest body 3 to wrap around a portion of the torso of the wearer when vest body 3 is positioned on a wearer's body. Belt 4 has a first end 6 and a second end 8 that are shown in FIG. 1 connected, joined or latched together by a belt connector 10. Belt connector 10 has connectable or latchable portions 12, 14 that are secured to first end 6 and second end 8, respectively. Latchable portion 12 is shown connected to latchable portion 14 to form a secure closed position.

Vest 2 has a crotch strap 16 that is connected to vest body 3. Crotch strap 16 is connected to a front portion 20 of vest body 3 by a strap 18 and to the back portion (not shown) by a strap 22. The connection can be an integral connection. Strap 18 is also shown in FIG. 1 as connected to strap 22 by a crotch connector 24 that has a first connector portion 26 connected to strap 18, and a second connector portion 28 connected to strap 22. First connector portion 26 is shown in FIG. 1 connected to second connector portion 28. Strap 18 and strap 22 are connected to vest body 3 by any conventional method such as, for example, by stitching.

Vest body 3 is connected to a back loop 30. Back loop 30 has a first shoulder strap 32 and a second shoulder strap 34. Vest body 3 is connected to first shoulder strap 32 and to second shoulder strap 34, for example, by stitching.

Figure 2:
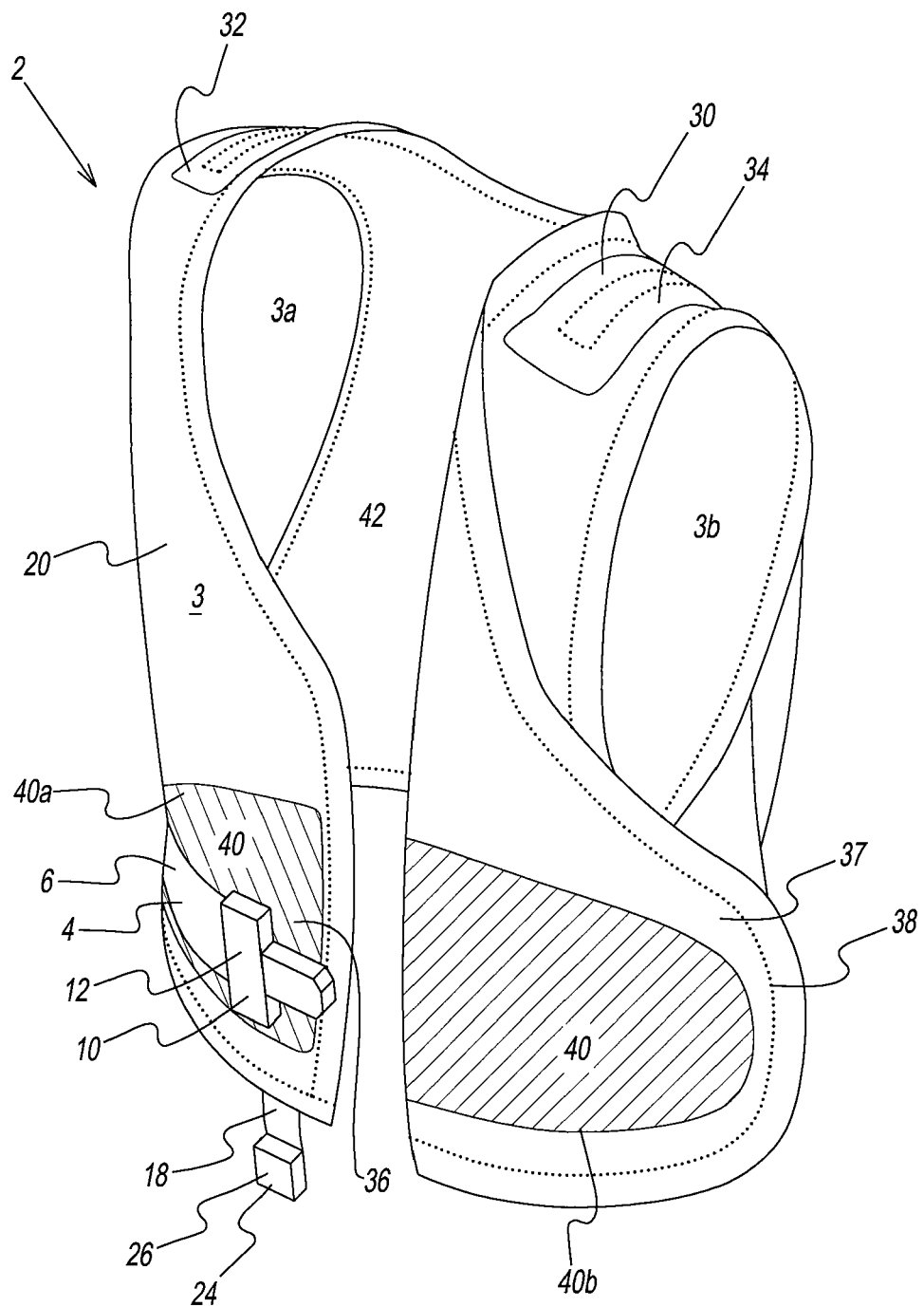
FIG. 2 is a top side perspective view of the vest of FIG. 1 in an open position.
Figure 3:
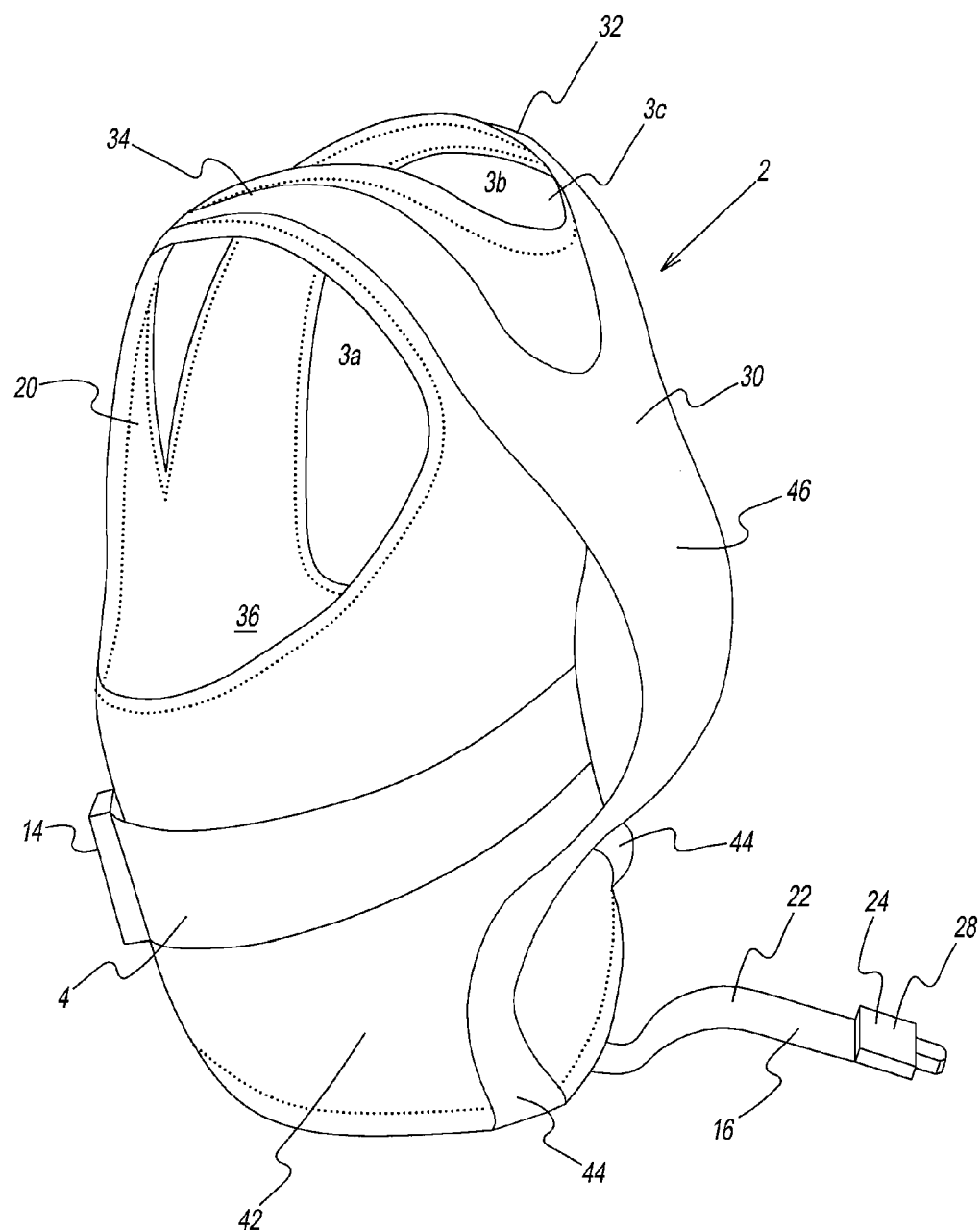
FIG. 3 is a rear side perspective view of the vest of FIG. 1 in the closed position.

Referring to FIG. 2, vest 2 is shown in an unlatched open position. Front portion 20 of vest body 3 is shown in FIG. 2 in a fold away position to reveal a first side portion 36 that had previously been shown concealed in FIG. 1 or covered by a second side portion 38, when first side portion 36 is connected to second side portion 38 and forms head hole 3c as shown in FIG. 1. First side portion 36 is connectable to second side portion 38, for example, by fastener 40. First side portion 36 has a first fastener portion 40a on an outer surface, and second side portion 38 has a second fastener portion 40b on an inner surface. Although first fastener portion 40a and second fastener portion 40b can be any conventional closure device that can be closed and reopened, a hook and loop type fastener construction provides a comfortable, secure, reliable and easily releasable connection that children do not have the strength or dexterity required to be released, as contrasted to such other fasteners which children, over a period of time, have been able to unlatch or release. Belt 4 and belt connector 10 secure the wearer's torso in vest 2, and provide an independent structure to maintain fastener 40 in a closed position Referring to FIG. 3, back loop 30 includes a central strap portion 46, first and second shoulder straps 32, 34 and rear straps 44. Back loop 30 is connected to vest body 3 on a first side by first shoulder strap 32 and second shoulder strap 34, on a second opposite side, and rear straps 44 on a back portion 42 to form a loop between central strap portion 46 and a back portion 42. Back portion 42 is connected between first side portion 36 and second side portion 38. First shoulder strap 32, second shoulder strap 34 and one or more rear straps 44 are connected to vest body 3, for example, by stitching. Belt 4 is between central strap 46 and vest body 3. Belt 4 may be connected to vest body 3, for example, by stitching.

Figure 4:
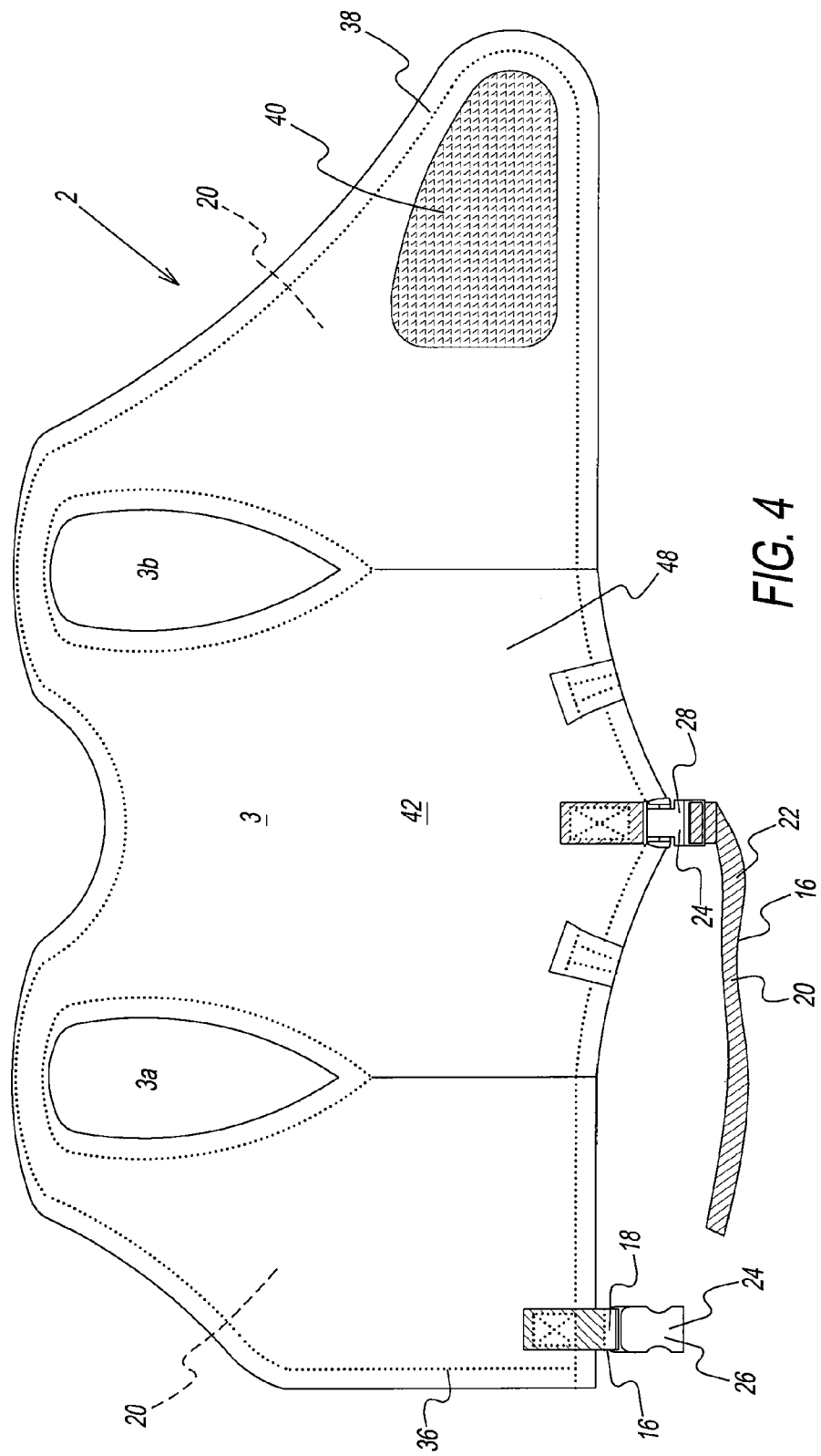
FIG. 4 is front plan view of an inside portion of the vest of FIG. 1.

As shown in FIG. 4, vest 2 is in the unlatched open position. First side portion 36 is separated from second side portion 38 by back portion 42. First connector portion 26 and second connector portion 28 of crotch connector 24 are shown in FIG. 4 as separated, and strap 18 is in unsecured position. In the open unlatched position, the wearer inserts each arm through a corresponding one of the pair of arm holes 3a and 3b so that the back of the wearer contacts an inner surface 48 of vest body 3.

Figure 5:
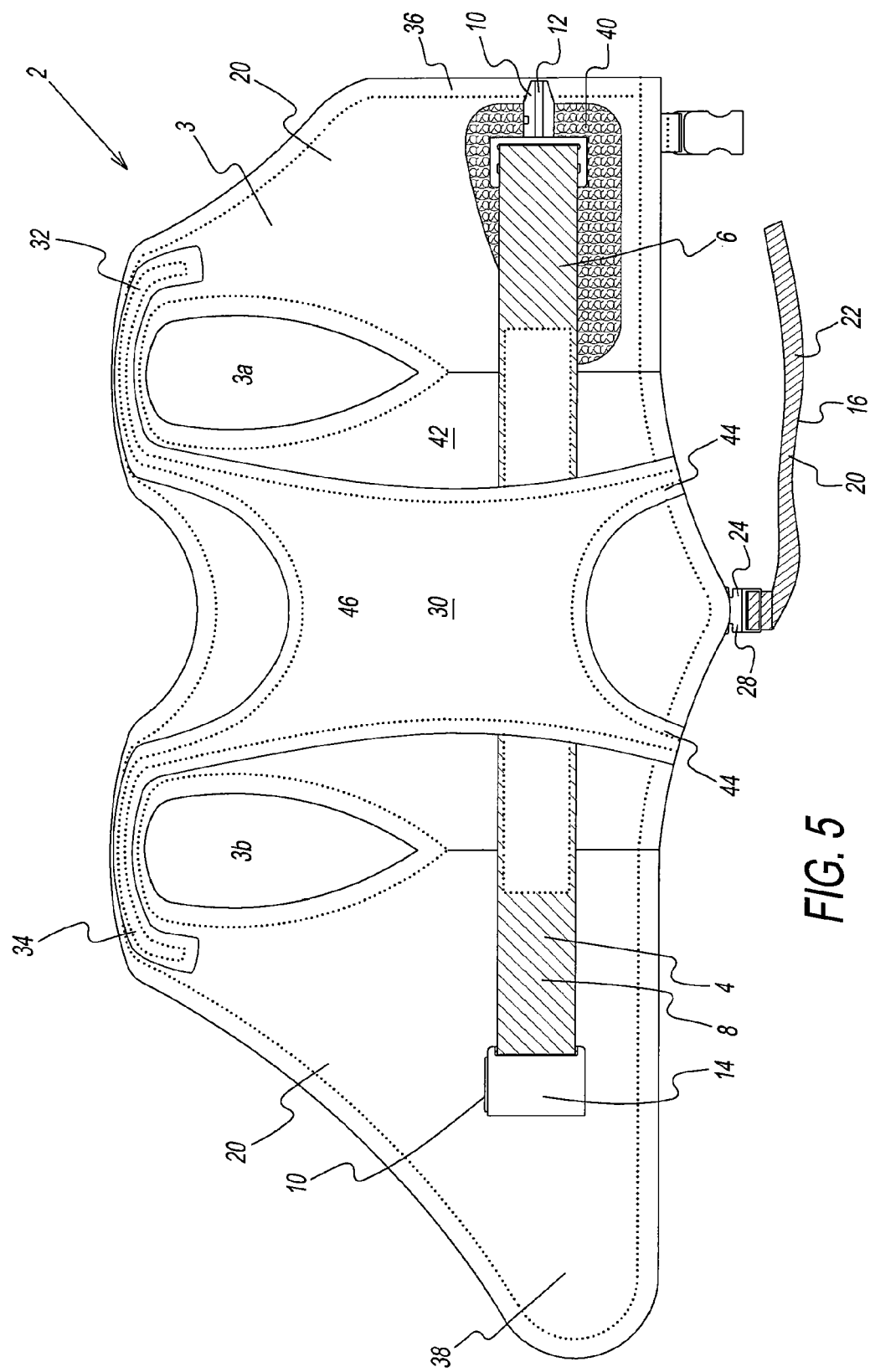
FIG. 5 is rear plan view of an outside portion of the vest of FIG. 1.

Referring to FIG. 5, belt connector 10 is shown in an unlatched or disconnected position where latchable portion 12 is separated from latchable portion 14. When belt connector 10 is unlatched or disconnected, first and second side portions 36, 38 of front portion 20 of vest body 3 can then be separated to open vest body 3. Concomitantly, when belt connector 10 is connected, first and second side portions 36, 38 cannot be separated to open vest body 3. Accordingly, belt 4 and belt connector 10 provide a second and independent structure to that of fastener 40 to maintain vest body 3 in the closed position.

Figure 6:
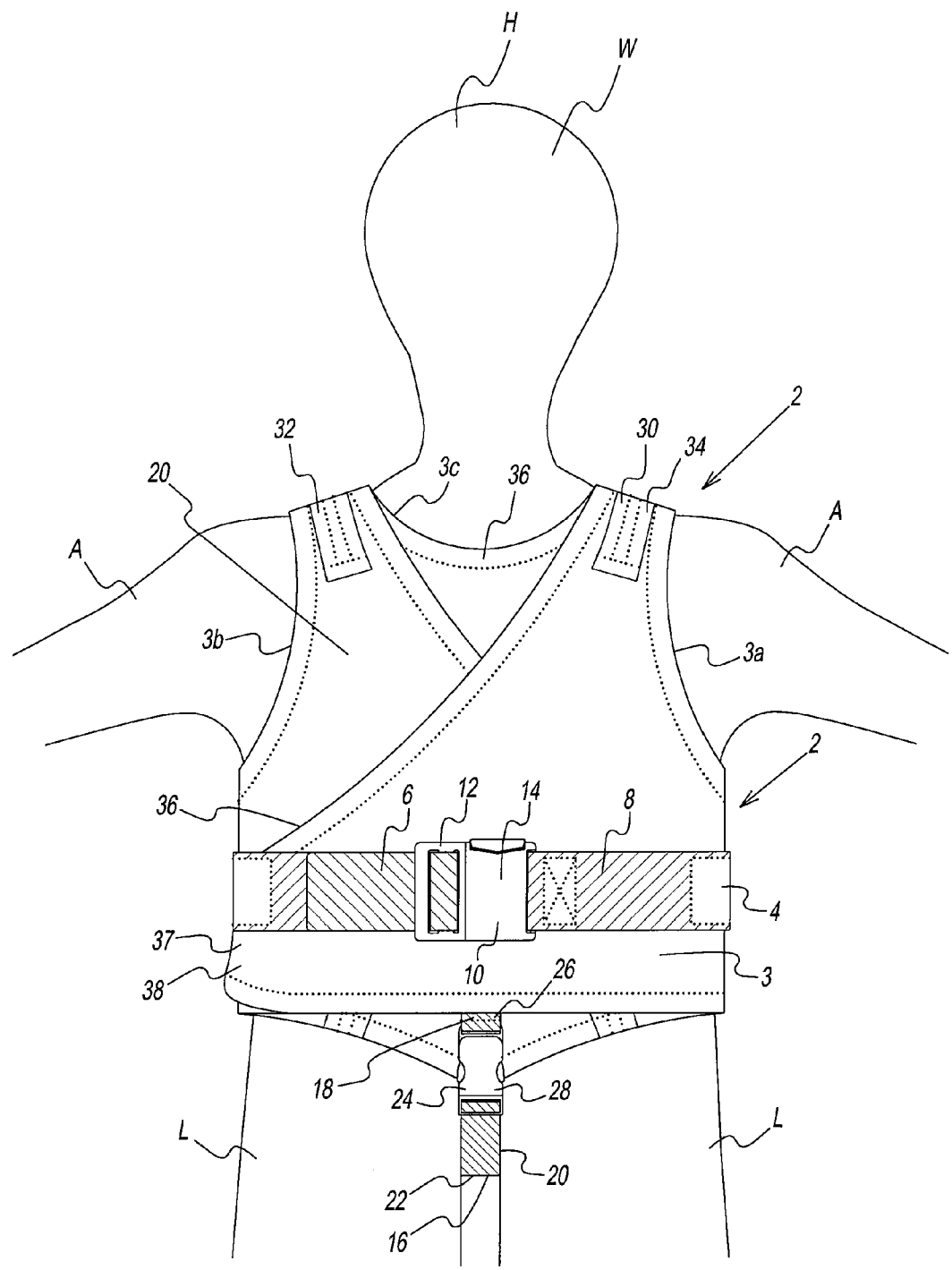
FIG. 6 a schematic front plan view of the vest of FIG. 1 in the closed position and positioned on a wearer.

Referring to FIG. 6, vest body 3 is shown in the closed position on a wearer and is positioned so that inner surface 48 (FIG. 4) is in contact with the wearer's chest, back and torso. Arms are shown positioned through arm holes 3a and 3b, and head H is positioned through head hole 3c. Second side portion 38 is shown overlapping first side portion 36. Second side portion 38 has a protrusion 37 that overlaps first side portion 36 as shown in the closed position depicted in FIG. 6. Protrusion 37 may extend to a back portion 42 in the closed position. First side portion 36 is connected to second side portion 38 and secured by fastener 40. First portion 12 and second portion 14 of belt connector 10 are shown in FIG. 6 connecting first end 6 and second end 8 of belt 4 and is positioned around the torso of the wearer (W). Strap 22 is positioned between legs (L) of wearer W and first connector portion 26 and second connector portion 28 of crotch connector 24 are connected to join or connect strap 18 and strap 22 in the secured position so that legs L are on opposite sides of the first crotch strap and the second crotch strap. Fastener 40, belt 4, strap 18 and strap 22 secure vest 2 to wearer W. Hook and loop fastener 40 connects first side portion 36 and second side portion 38 in the event that first end 6 and a second end of belt 4 are disconnected and vice versa.

Figure 7:
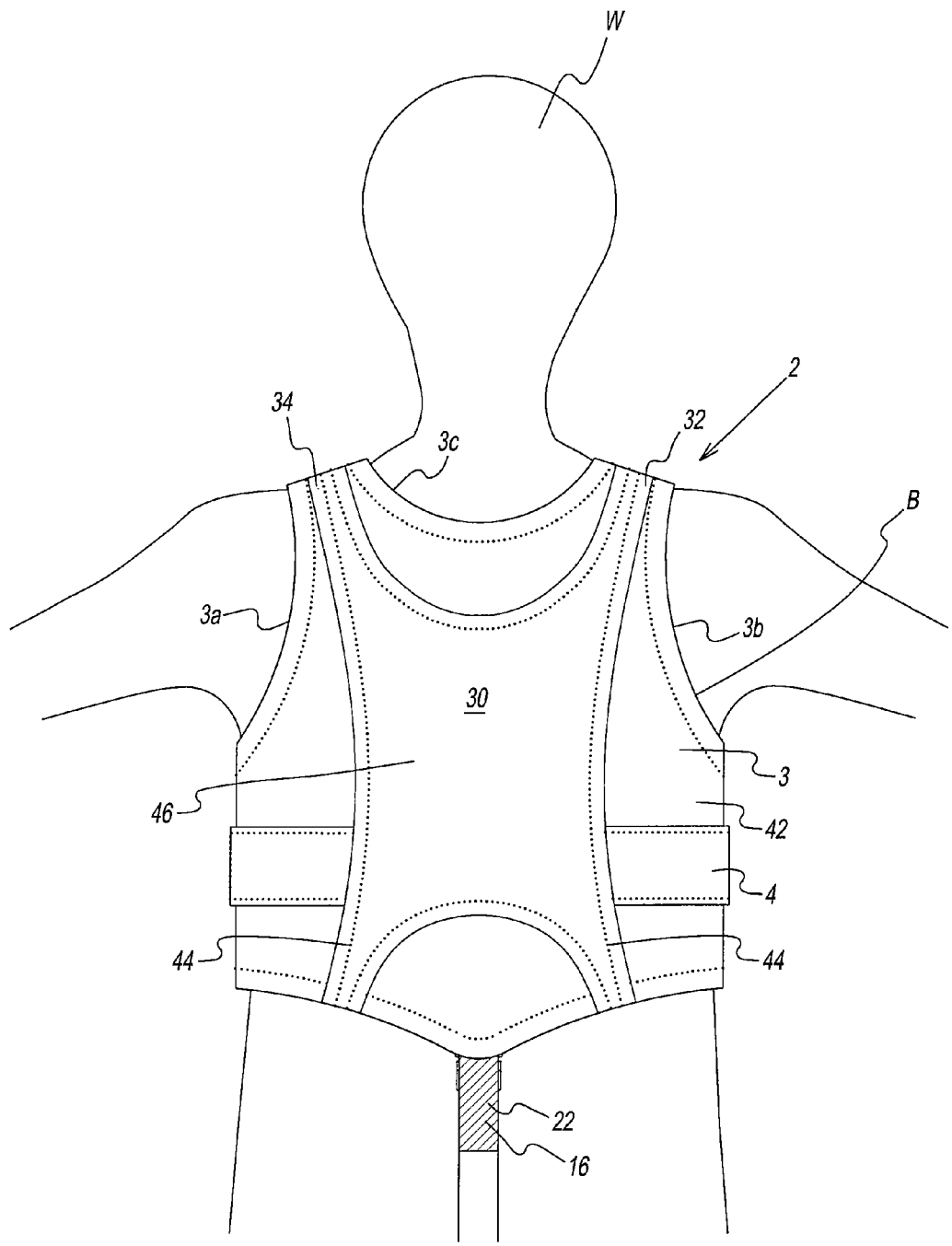
FIG. 7 a schematic rear plan view of the vest of FIG. 1 in the closed position and positioned on the wearer.

Referring to FIG. 7, vest 2 is shown in the closed position and secured to wearer W where back loop 30 is positioned on wearer's back (B). In use, a seat belt of the vehicle (not shown) is passed between back loop 30 and vest body 3, and the seat belt is secured to a seat belt buckle (not shown). The seat belt is positioned between back loop 30 and vest body 3 while wearer W is seated in the vehicle, so that the shoulder harness and waist restraint of the seat belt when secured in the vehicle are behind the back of the wearer W. Back loop 30 and vest body 3 of vest 2 provide for positioning the vehicle seat belt and shoulder harness assembly behind the wearer W, eliminating the possibility of possible physical injury such as injury to the wearer's internal organs, which can occur from the use of conventional shoulder and seat belt harness in the event of a vehicle collision or abrupt stop.

Size of vest 2 can be based on a range of wearer's age and weight. Vest 2 secures the wearer W to a seat in a moving vehicle even if the seatbelt and shoulder harness of the vehicle are not sized to fit wearer W. For example, there is a particular need for vest 2 to be sized for a child about 3-8 years old and about 35-72 pounds. Vest 2 is compact, portable, lightweight, easy to carry and user friendly. As shown and described, vest 2 is easy to put on and remove from wearer W for example, vest 2 can be secured using high strength hook and loop fasteners and high strength plastic buckles. Vest 2 may be made of high strength and flame retardant materials that comply with appropriate federal standards. Vest 2 can be used for children, mentally impaired, physically impaired as a safety vest. Vest 2 positions the seatbelt behind wearer W eliminating damage to internal organs in event of a vehicle collision.

Although vest body 3 and back loop 30 can be constructed from their several individual parts, the vest body and the back loop can each be a unibody or made from a single piece of material. Unibody construction of vest body 3 and back loop 30 enables forces that are imparted to the wearer by the vest body and the back loop to be distributed across the torso, chest and shoulders of the wearer as contrasted to the higher forces that would be imparted to a passenger by a seat belt and a shoulder harness.

The composition of the material of vest body 3 and back loop 30 may be fabric that can distribute the forces resulting from an accident, impact or sudden stop across the surface area of the vest body and/or back loop as well as resist the forces imparted to the fabric from the vehicle's seat belt and safety harness.

The overlapping feature of the side portions and associated connector portions of vest body 30 discussed above permits adjustments to be made to fit on the wearer W due to wearer's size, weight and clothing being worn. In a seat belt and harness configuration in most vehicles, a spring mechanism or tensioner keeps these belts pressed against the torso and lap of the passenger. Vest 2 has shoulder straps 50 (shown in FIG. 1) that provide additional locations of restraint for each shoulder, further reducing and distributing the forces imparted to the wearer in a collision or resulting from a sudden stop.

Vest body 3 can have an outer shell made of 100 percent nylon and treated with a fire retardant and an inner core that is made of a material sold under the registered trademark Kevlar®, or a para-aramid synthetic fiber, and/or ballistic nylon. Vest body 3 can also have an inside shell or wall which can be 100 percent nylon treated with a fire retardant. Also, an edge band of the vest body 3, if used, is fire rated fabric.

Belt connector 10 can be made of a flat nylon webbing. Latchable portion 12 and latchable portion 14 can be made of plastic release buckles that fit together by snap fit.

Strap 18 and strap 22 can be made from a material, for example, flat nylon webbing. First connector portion 26 and second connector portion 28 are made in the form of release buckles that fit together by snap fit.

Back loop 30 can be made of fire resistant Nomex®, which is a registered trademark for flame resistant meta-aramid material, or Indura, which is a flame-resistant treated cotton that has an inner core made of a material sold under the registered trademark Kevlar®, or a para-aramid synthetic fiber, and/or ballistic nylon. Also, back loop 30 can be a fire rated fabric band.

It is believed that the structure and the way the vest 2 is connected to existing seat belts provides greater security, yet more flexibility so that the wearer does not receive as severe a jolt should the vehicle be in an accident or require a sudden stop. In addition, vest 2 clearly provides greater ease of securing the vest to the belt seat.

It should be recognized that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

I claim:

1. A portable restraining passenger safety vest comprising:
a vest body having a back portion, a first side portion connected to said back portion and a second side portion connected to said back portion on a side opposite said first side portion, said first side portion having an outer surface and said second side portion having an inner surface, said first side portion having a first connector connected to said outer surface of said first side portion and said second side portion having a second connector connected to said inner surface of said second side portion, wherein when said second side portion and said first side portion are connected, an opening is formed in said vest body for accepting the head of a passenger and an opening is formed in said vest body for accepting the torso of a passenger, wherein said first side portion has a substantially vertical edge disposed between said opening for accepting the head of the passenger and said opening for accepting the torso of the passenger, and wherein said second side portion overlaps said first side portion past said vertical edge so that a wearer is secured in the vest when said first side portion overlaps said second side portion in a closed position;
a belt disposed away from said opening for accepting said torso, said belt having a first end and a second end that are connectable so that said belt surrounds said back portion, said first side portion and said second side portion of said vest body when said first end and said second end are in a connected position; and
a back loop connected to said vest body, said back loop having a first and second shoulder straps disposed apart from one another and connected to said vest body at separate left and right shoulder areas, said connection of said shoulder straps at said shoulder areas being connected to said back portion and each said side portions and a first and second rear straps disposed apart from one another and connected to said vest body at separate left and right areas at said opening for accepting the torso, to form a loop between said shoulder straps and said rear straps, said back loop not connected to said back portion between said shoulder straps and not connected to said back portion between said rear straps, said belt passing through said loop between said first shoulder strap and said rear strap, and said loop being disposed away from the opening for accepting the head of the passenger between said shoulder straps and said loop being disposed away from the opening for accepting the torso of the passenger between said rear straps, said loop being disposed away from said opening for accepting the head of the passenger between said shoulder straps and being disposed away from said opening for accepting the torso of the passenger between said rear straps, said loop between said shoulder straps and said rear straps being sized so that a seat belt can pass therethrough.

2. The portable restraining passenger safety vest of claim 1, wherein said loop is sized so that the seat belt and a shoulder harness of a vehicle can pass therethrough.

3. The vest of claim 1, further comprising a crotch strap comprising a first portion connected to said back portion and a second portion connected to one of said first side portion and said second side portion.

4. The vest of claim 3, wherein said first portion is connectable to said second portion.

5. The vest of claim 1, wherein said first connector and said second connector are a hook and loop fastener.

6. The vest of claim 1, wherein said back portion, said first side portion and said second side portion form a first arm hole and a second arm hole.

7. The vest of claim 1, wherein said vest body is paramid synthetic fiber and/or ballistic nylon, with an inside shell that is 100 percent nylon treated with a fire retardant.

8. The vest of claim 7, further comprising an edge band that is made of fire rated fabric.

9. The vest of claim 1, wherein said first end and said second end are connected by a belt connector.

10. The vest of claim 9, wherein said belt connector is a snap fit connection.

11. The vest of claim 1, wherein said second side portion has a protrusion.

12. The vest of claim 11, wherein said protrusion overlaps a majority of said first side portion in said closed position to provide chest support to the wearer.

13. The vest of claim 12, wherein said protrusion extends to said back portion in said closed position.

* * * * *